(12) United States Patent
Uehara et al.

(10) Patent No.: US 10,982,792 B2
(45) Date of Patent: Apr. 20, 2021

(54) ELECTRIC VALVE

(71) Applicant: Fujikoki Corporation, Tokyo (JP)

(72) Inventors: Satoshi Uehara, Tokyo (JP); Yusuke Arai, Tokyo (JP); Takeshi Hosoya, Tokyo (JP)

(73) Assignee: FUJIKOKI CORPORATION, Tokyo (JP)

( * ) Notice: Subject to any disclaimer, the term of this patent is extended or adjusted under 35 U.S.C. 154(b) by 44 days.

(21) Appl. No.: 16/482,030

(22) PCT Filed: Jan. 30, 2018

(86) PCT No.: PCT/JP2018/002925
§ 371 (c)(1),
(2) Date: Jul. 30, 2019

(87) PCT Pub. No.: WO2018/150863
PCT Pub. Date: Aug. 23, 2018

(65) Prior Publication Data
US 2019/0353271 A1 Nov. 21, 2019

(30) Foreign Application Priority Data
Feb. 20, 2017 (JP) .............................. JP2017-029192

(51) Int. Cl.
*F16K 37/00* (2006.01)
*F16K 31/08* (2006.01)
(Continued)

(52) U.S. Cl.
CPC .......... *F16K 37/0033* (2013.01); *F16K 31/04* (2013.01); *F16K 31/046* (2013.01);
(Continued)

(58) Field of Classification Search
CPC .... F16K 31/04; F16K 31/046; F16K 37/0033; F16K 37/0041; Y10T 137/8242; G01D 5/145; F01L 2009/0469
See application file for complete search history.

(56) References Cited

U.S. PATENT DOCUMENTS 5,316,263 A * 5/1994 Mino .................... F25B 41/062
251/129.05
6,561,480 B1 * 5/2003 Komiya .................. F16K 31/04
251/129.12
(Continued)

FOREIGN PATENT DOCUMENTS

DE 102016204151 A1 10/2016
EP 1391598 A2 2/2004
(Continued)

OTHER PUBLICATIONS

International Search Report dated May 1, 2018 for PCT/JP2018/002925 and English translation.
(Continued)

*Primary Examiner* — Atif H Chaudry
(74) *Attorney, Agent, or Firm* — Lucas & Mercanti, LLP

(57) ABSTRACT

An object of the present invention is to provide an electrically operated valve capable of more accurately detecting the position of a valve body. In order to achieve the above object, the electrically operated valve of the present invention comprises a valve body, a driver configured to move the valve body along a first axis, a rotation shaft configured to rotate the driver around the first axis, a permanent magnet member, and an angle sensor. The permanent magnet member is disposed on the rotation shaft and configured to rotate with the rotation shaft. The angle sensor is configured to detect a rotation angle of a permanent magnet included in the
(Continued)

permanent magnet member. The angle sensor is disposed above the permanent magnet.

10 Claims, 13 Drawing Sheets

(51) Int. Cl.
  *G01D 5/244* (2006.01)
  *F16K 31/04* (2006.01)
(52) U.S. Cl.
  CPC .......... *F16K 31/08* (2013.01); *F16K 37/0041* (2013.01); *G01D 5/24457* (2013.01); *Y10T 137/8242* (2015.04)

(56) References Cited

U.S. PATENT DOCUMENTS

| | | |
|---|---|---|
| 2005/0000580 A1 | 1/2005 | Tranovich et al. |
| 2005/0028871 A1 | 2/2005 | Kurita et al. |
| 2008/0164867 A1 | 7/2008 | Steinich et al. |
| 2009/0123098 A1 | 5/2009 | Takahashi |
| 2009/0151436 A1 | 6/2009 | Nagahori et al. |
| 2012/0169325 A1* | 7/2012 | Iwahashi .............. G01D 11/245 324/207.25 |
| 2012/0248355 A1 | 10/2012 | Harada et al. |
| 2014/0231684 A1 | 8/2014 | Shimura et al. |
| 2014/0368192 A1* | 12/2014 | Kaneko .................... G01B 7/30 324/207.25 |
| 2015/0160042 A1* | 6/2015 | Bogos ...................... G01D 5/20 324/207.15 |
| 2015/0226581 A1* | 8/2015 | Schott .................... G01D 5/145 324/207.2 |
| 2015/0323346 A1 | 11/2015 | Maiterth et al. |
| 2016/0285331 A1* | 9/2016 | Ichikawa ................ G01D 5/145 |
| 2018/0180497 A1* | 6/2018 | Nishiguchi ............ G01D 3/028 |

FOREIGN PATENT DOCUMENTS

| | | |
|---|---|---|
| JP | H08-326952 A | 12/1996 |
| JP | 2001012633 A | 1/2001 |
| JP | 2005054654 A | 3/2005 |
| JP | 2006-233985 A | 9/2006 |
| JP | 2008-215942 A | 9/2008 |
| JP | 2009-145293 A | 7/2009 |
| JP | 2014161152 A | 9/2014 |
| JP | 2016090499 A | 5/2016 |
| JP | 2018-511759 A | 4/2018 |
| WO | 2016/091941 A1 | 6/2016 |

OTHER PUBLICATIONS

Japanese Patent Office, Office Action dated Mar. 3, 2020 for the corresponding Japanese patent application No. 2017-029192, with machine-generated English translation (10 pages).
Chinese Intellectual Property Office, Office Action dated Jun. 18, 2020 for the corresponding Chinese patent application No. 201880012990.7, with machine-generated English translation (10 pages).
Korean Intellectual Property Office, Office Action dated Aug. 6, 2020 for the corresponding Korean patent application No. 10-2019-7023112, with machine-generated English translation (15 pages).
KIPO, Office Action for the related Korean patent application No. 10-2019-7027317, dated Oct. 1, 2020, with machine-generated English translation.
EPO, Extended European Search Report for the related European application No. 18774675.5, dated Nov. 13, 2020.
JPO, Office Action for the corresponding Japanese Patent Application No. 2017-070366, dated Jun. 30, 2020, with English machine generated translation.
CNIPA, Office Action for the corresponding Chinese Patent Application No. 201880022103.4, dated Jul. 31, 2020, with English machine generated translation.
JPO, Submission of Publications for the related Japanese application No. 2017-070366, submitted on Nov. 19, 2019, with machine generated English translation.
International Search Report for related application PCT/JP2018/006233, dated May 29, 2018, and English translation.
Written Opinion of ISA for related application PCT/JP2018/006233, dated May 29, 2018 (Japanese only).
EPO, Extended European Search Report for the related European application No. 18753791.5, dated Oct. 30, 2020.

* cited by examiner

FIG. 9
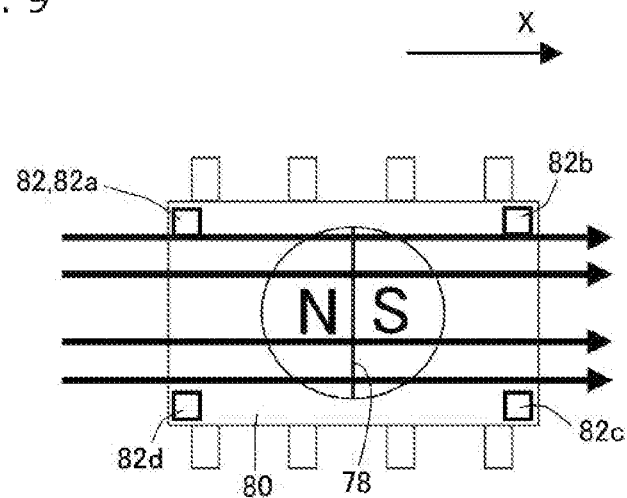
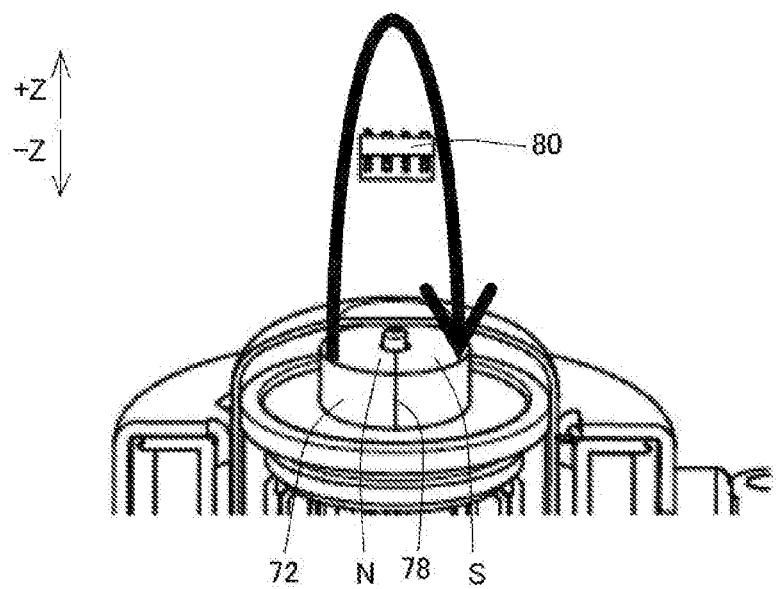

FIG. 10
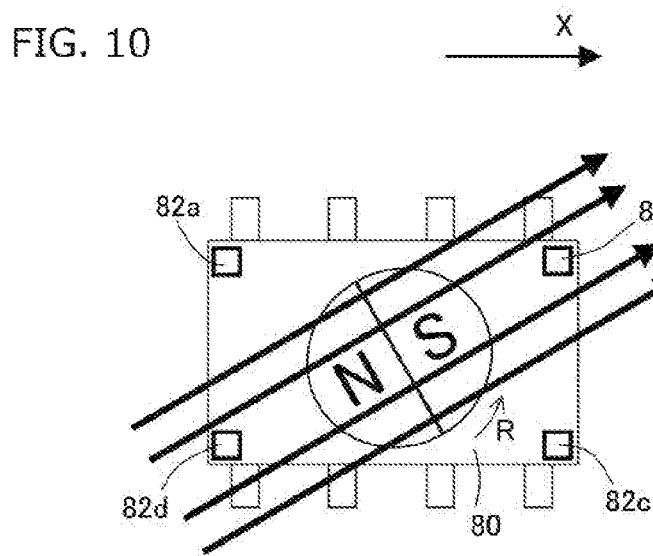
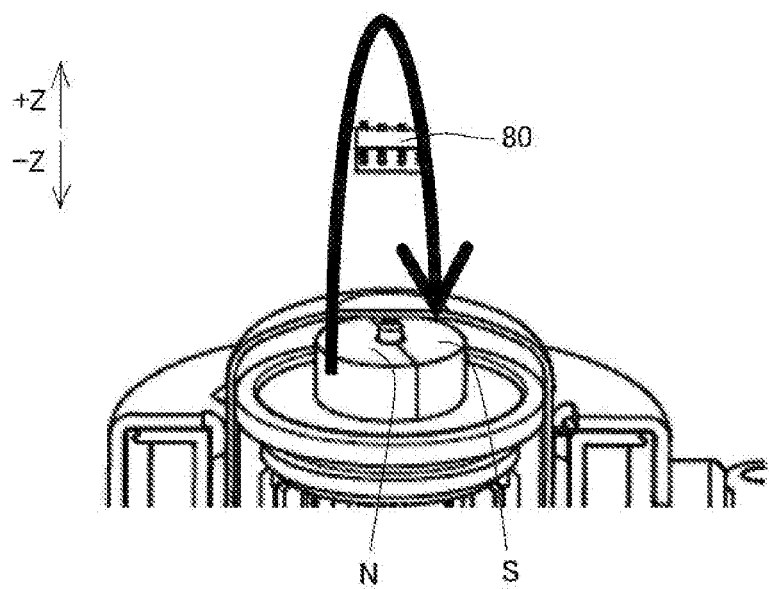

ELECTRIC VALVE

CROSS REFERENCE TO RELATED APPLICATION

This Application is a 371 of PCT/JP2018/002925 filed on Jan. 30, 2018 which, in turn, claimed the priority of Japanese Patent Application No. 2017-029192 filed on Feb. 20, 2017, both applications are incorporated herein by reference.

TECHNICAL FIELD

The present invention relates to an electrically operated valve, and more particularly, to an electrically operated valve capable of detecting the position of a valve body.

BACKGROUND OF THE INVENTION

The use of angle sensors to detect the valve opening degree of electrically operated valves is known.

As an example of a related technique, Patent Document 1 discloses a valve opening degree detection device for an electrically operated valve. The valve opening degree detection device described in Patent Document 1 includes a magnetic drum in which north and south poles fixed to a rotation axis are equally divided on the circumference, a rotation angle detection magnetic sensor provided on the circumference of the outer side of a can opposite to the north-south pole, a magnet provided on the end of the rotation axis, a vertical position detection magnetic sensor provided on the outer side of the can opposite to the magnet, and a valve opening degree calculation means for calculating a valve opening degree based on the detected values of the rotation angle detection magnetic sensor and the vertical position detection magnetic sensor.

Also, Patent Document 2 discloses an electrically operated valve that utilizes a stepping motor. The electrically operated valve disclosed in Patent Document 2 includes a stator, a rotor rotationally driven by the stator, a detection rotor for detecting a rotational position of the rotor, and a Hall IC disposed outside the detection rotor. In the electrically operated valve described in Patent Document 2, the rotational position of the rotor is detected based on an output signal detected by a Hall IC disposed on an outer side of the detection rotor.

CITATION LIST

Patent Literature

[Patent Document 1] Japanese Patent Application Publication No. 2001-12633
[Patent Document 2] Japanese Patent Application Publication No. 2014-161152

SUMMARY OF INVENTION

Technical Problem

In the electrically operated valve described in Patent Documents 1 and 2, the rotation angle of a rotating body such as a rotor is detected by a magnetic sensor disposed in the radially outer direction of the rotating body. However, when the rotation angle of the rotating body is detected by a magnetic sensor disposed in the radially outer direction of the rotating body, it is difficult to accurately detect the rotation angle of the rotating body unless a large number of magnetic sensors are disposed in the radially outer direction of the rotating body. Disposing a large number of magnetic sensors, however, increases the cost. In addition, it becomes necessary to secure sufficient space for disposing a large number of magnetic sensors, and there is a risk that the support mechanism for supporting the large number of magnetic sensors may become complicated. In addition when the magnetic sensor detects the rotation angle by increasing or decreasing the Hall current, the rotation angle information is lost when the power is turned off, and when the power is turned on again, the absolute rotation angle of the rotating body may not be known.

It is therefore an object of the present invention to provide an electrically operated valve capable of more accurately detecting the position of the valve body by more accurately detecting the rotation angle of a rotation shaft.

Solution to Problem

In order to achieve the above object, the electrically operated valve according to the present invention includes a valve body, a driver configured to move the valve body along a first axis, a rotation shaft configured to rotate the driver around the first axis, a permanent magnet member disposed on the rotation shaft and configured to rotate with the rotation shaft, and an angle sensor configured to detect a rotation angle of a permanent magnet included in the permanent magnet member. The angle sensor is disposed above the permanent magnet.

In the electrically operated valve according to some embodiments, the angle sensor may be supported by a control substrate configured to control the rotational movement of the rotation shaft.

In the electrically operated valve according to some embodiments, a case for accommodating the permanent magnet member may be included. An end wall of the case may be disposed between the angle sensor and the permanent magnet member.

In the electrically operated valve according to some embodiments, a permanent magnet positioning member configured to maintain a constant distance between the permanent magnet and the angle sensor may be disposed inside the case.

In the electrically operated valve according to some embodiments, a partition member configured to divide a space within the case into an upper space and a lower space may be further included. The permanent magnet member may be disposed in the upper space. It should be noted that the partition member may be formed of a soft magnetic material.

In the electrically operated valve according to some embodiments, the driver and the rotation shaft may be separate bodies. The driver and the rotation shaft may be movable relative to each other along the first axis.

In the electrically operated valve according to some embodiments, the rotation shaft may be movable relative to the permanent magnet member in a direction along the first axis. The permanent magnet member may include a second engagement portion configured to engage with a first engagement portion of the rotation shaft such that the permanent magnet rotates with the rotation shaft.

In the electrically operated valve according to some embodiments, the angle sensor may include a plurality of magnetic detection elements configured to detect a component of a magnetic flux in a direction along the first axis.

In the electrically operated valve according to some embodiments, a stator member that includes a coil, a rotor
} member coupled to the rotation shaft so as to enable power transmission, and a computing device configured to determine the presence or absence of an operation normality of the electrically operated valve may be further included. The computing device may determine the presence or absence of an operation abnormality of the electrically operated valve based on the rotation angle measured by the angle sensor and a number of input pulses to the coil.

Advantageous Effects of Invention

According to the present invention, it is possible to provide an electrically operated valve capable of more accurately detecting the position of a valve body.

BRIEF DESCRIPTION OF DRAWINGS

FIG. 9 is a diagram schematically illustrating the placement relationship between the permanent magnet and the angle sensor.
FIG. 10 is a diagram schematically illustrating the placement relationship between the permanent magnet and the angle sensor.

DESCRIPTION OF EMBODIMENT(S)

Figure 1:
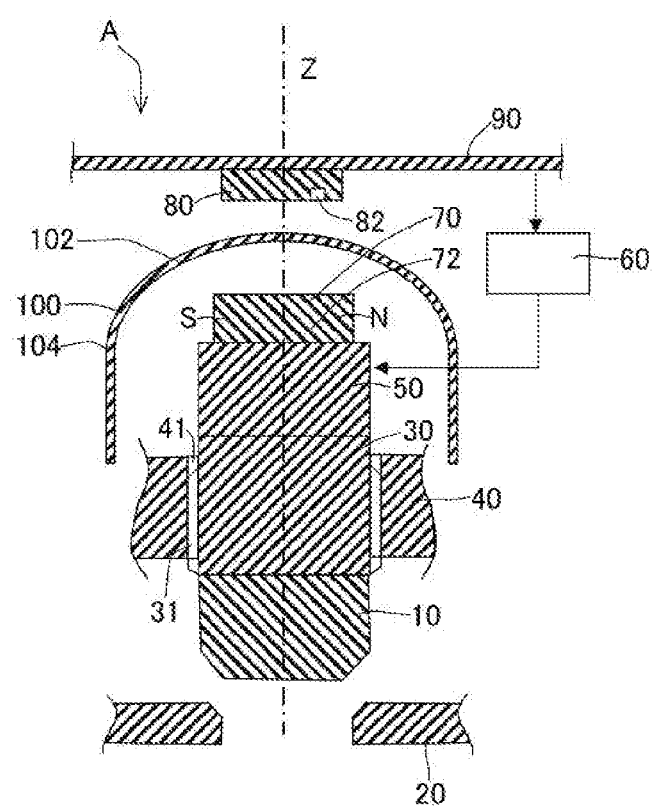
FIG. 1 is a schematic cross-sectional view illustrating an overview of an electrically operated valve according to the first embodiment.

Hereinafter, an electrically operated valve according to embodiments will be described with reference to the drawings. It should be noted that in the following description of the embodiments, parts and members having the same functions are denoted by the same reference numerals, and repetitive descriptions of parts and members denoted by the same reference numerals are omitted.

First Embodiment

Referring to FIG. 1, a description will be provided of an electrically operated valve A according to the first embodiment. FIG. 1 is a schematic cross-sectional view illustrating an overview of an electrically operated valve A according to the first embodiment. It should be noted that, in FIG. 1, in order to avoid complication of the drawing, a portion of the electrically operated valve A is omitted.

The electrically operated valve A includes a valve body 10, a driver 30, a rotation shaft 50, a power source 60 for transmitting power to the rotation shaft 50, a permanent magnet member 70 that includes a permanent magnet 72, and an angle sensor 80 for detecting a rotation angle of the permanent magnet 72.

The valve body 10 closes the flow path by contacting the valve seat 20, and opens the flow path by separating from the valve seat 20.

The driver 30 is a member for moving the valve body 10 along the first axis Z. In the example illustrated in FIG. 1, an external thread 31 is provided on the outer peripheral surface of the driver 30. The external thread 31 is screwed to an internal thread 41 provided on a guide member 40 for guiding the driver. As the driver 30 rotates relative to the guide member 40, the driver 30 moves along the first axis Z. The driver 30 and the valve body 10 are mechanically connected to each other. Accordingly, when the driver 30 moves along the first axis Z, the valve body 10 also moves along the first axis Z. It should be noted that the driver 30 and the valve body 10 may be integrally formed or may be separately formed.

The rotation shaft 50 is a member for rotating the driver 30 about the first axis Z. The rotation shaft 50 receives power from a power source 60 and rotates about the first axis Z. The rotation shaft 50 and the driver 30 are mechanically connected to each other. Accordingly, when the rotation shaft 50 rotates about the first axis Z, the driver 30 also rotates about the first axis Z. The rotation shaft 50 and the driver 30 may be integrally formed or may be separately formed.

In the example illustrated in FIG. 1, the valve body 10, the driver 30, and the rotation shaft 50 are arranged on a straight line (i.e., on the first axis Z). Accordingly, the motion conversion mechanism for converting the rotational motion of the rotation shaft 50 into the axial motion of the valve body 10 is simplified. It should be noted that the embodiments are not limited to an arrangement in which the valve body 10, the driver 30, and the rotation shaft 50 form a straight line.

The permanent magnet member 70 rotates about the first axis Z together with the rotation shaft 50. The permanent magnet member 70 includes a permanent magnet 72, and the permanent magnet 72 includes a north pole and a south pole in a cross section perpendicular to the first axis Z. The permanent magnet member 70 may be fixed to the rotation shaft 50. Alternatively, as illustrated in the third embodiment to be described later, the permanent magnet member 70 may be non-rotatable relative to the rotation shaft 50 and may be movable relative to the rotation shaft 50 in the first axis Z direction.

The angle sensor 80 detects the rotation angle of the permanent magnet 72 included in the permanent magnet member 70. The angle sensor 80 is disposed above the permanent magnet 72. Since the angle sensor 80 is a sensor for detecting the rotation angle of the permanent magnet 72, it is arranged separately from the rotating body that includes the permanent magnet 72. The angle sensor 80 includes a magnetic detection element 82 for detecting a magnetic flux density or the like. As the permanent magnet 72 rotates about the first axis Z, the magnetic flux passing through the magnetic detection element 82 changes. In this way, the magnetic detection element 82 (the angle sensor 80) detects the rotation angle of the permanent magnet 72 about the first axis Z.

As the permanent magnet 72 rotates about the first axis Z, the angle of the magnetic flux passing through the magnetic detection element 82 located above the permanent magnet continuously changes. As a result, the magnetic detection element 82 (angle sensor 80) can continuously detect the rotation angle of the permanent magnet 72 about the first axis Z. In the example illustrated in FIG. 1, the change in the rotation angle of the permanent magnet 72 about the first axis Z is proportional to the change in the position of the valve body 10 in a direction along the first axis Z. Therefore, the angle sensor 80 detects the rotation angle of the permanent magnet 72 about the first axis Z, whereby the position of the valve body 10 in the direction along the first axis Z, that is, the opening degree of the valve can be calculated. The electrically operated valve A may include a computing device that converts the angle data output from the angle sensor 80 into position data of the valve body 10 in a direction along the first axis Z, that is, opening degree data for the valve. The computing device may be disposed on a control substrate 90.

In the present specification, the end of the rotation shaft 50 on the valve body 10 side is referred to as a second end, and the end of the rotation shaft 50 on the opposite side to the valve body is referred to as a first end. Also, in the present specification, "upward" is defined as the direction extending from the second end toward the first end. Accordingly, in reality, even in a case in which the second end portion were to be further downward from the first end portion, the direction extending from the second end portion toward the first end portion is referred to as "upward" in this specification. It should be noted that, in the present specification, the direction opposite to the upward direction, that is, the direction extending from the first end to the second end is referred to as "downward." Further, the angle sensor 80 is not limited to an arrangement in which the center coincides with the rotation axis of the rotation shaft 50, and the mounting position may be changed in accordance with the measurement sensitivity.

Optional Additional Configuration Example 1

Next, an optional additional configuration example that can be employed in the first embodiment will be described. In Configuration Example 1, the valve body 10, the rotation shaft 50, the permanent magnet 72, and the angle sensor 80 are arranged in a straight line. By arranging the valve body 10, the rotation shaft 50, the permanent magnet 72, and the angle sensor 80 in a straight line, it is possible to make the entire electrically operated valve A, including the drive mechanism of the valve body and the rotation angle detection mechanism of the permanent magnet (put differently, the position detection mechanism of the valve body), compact.

Optional Additional Configuration Example 2

In Configuration Example 2, the angle sensor 80 is supported by a control substrate 90 that controls the rotational operation of the rotation shaft 50. Accordingly, it is unnecessary to separately prepare a support member for supporting the angle sensor 80. As a result, the structure of the electrically operated valve A can be simplified, and the size of the electrically operated valve A can be reduced. It should be noted that the control substrate 90 transmits a control signal to the power source 60 to control the operation of the power source.

Optional Additional Configuration Example 3

In Configuration Example 3, the electrically operated valve A includes a case (for example, a metal can 100) for accommodating the permanent magnet 72. The end wall 102 of the case is disposed between the angle sensor 80 and the permanent magnet member 70. In other words, the angle sensor 80 and the permanent magnet member 70 are disposed to face each other with the end wall 102 of the case interposed therebetween. It should be noted that the case is not a rotating body that rotates about the first axis Z. Accordingly, when the electrically operated valve A operates, the permanent magnet 72 rotates relative to the case, which is in a stationary state. When a rotating body such as the permanent magnet 72 rotates within the case, there is a possibility that the vibration of the rotating body is transmitted to the case. In the example illustrated in FIG. 1, since the angle sensor 80 is disposed apart from the case, the vibration of the rotating body is suppressed from being transmitted to the angle sensor 80. Therefore, the angle detection accuracy of the permanent magnet by the angle sensor 80 is improved.

In the example illustrated in FIG. 1, the end wall 102 of the case covers the upper surface of the permanent magnet member 70. In the example illustrated in FIG. 1, the end wall 102 has an upwardly convex dome shape. Also, a cylindrical side wall 104 extends downward from the end wall 102 of the case.

It should be noted that in the first embodiment, it is possible for Configuration Examples 1 to 3 to be employed in combination. For example, in the first embodiment, Configuration Example 1 and Configuration Example 2, Configuration Example 2 and Configuration Example 3, or Configuration Examples 1 to 3 may be employed. In addition, Configuration Examples 1 to 3 may be employed in the embodiments to be described later (the second embodiment and the third embodiment).

Second Embodiment

Figure 2:
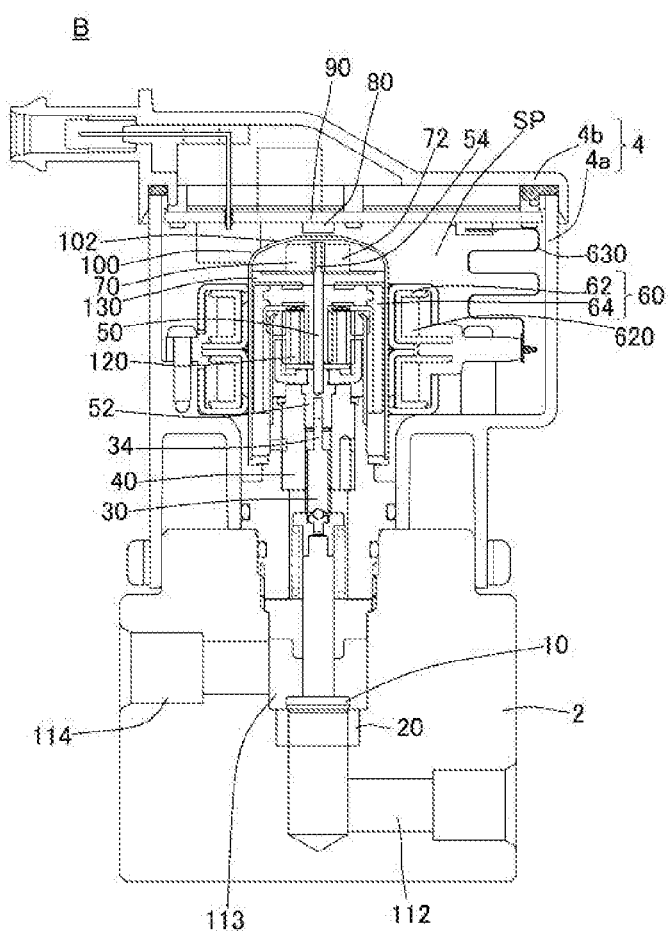
FIG. 2 is a schematic cross-sectional view of an electrically operated valve according to the second embodiment.
Figure 3:
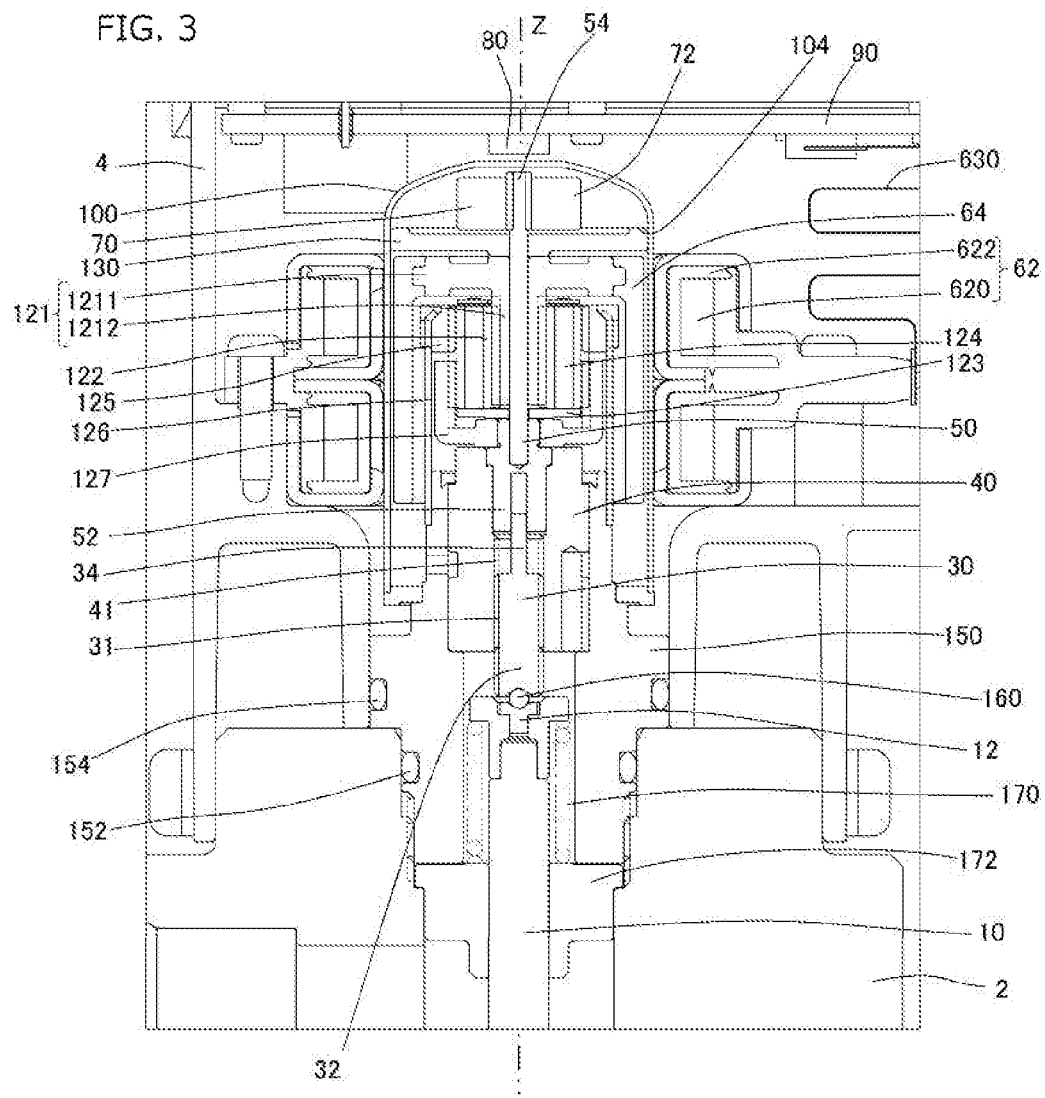
FIG. 3 is a schematic enlarged cross-sectional view of a portion of the electrically operated valve according to the second embodiment.
Figure 4:
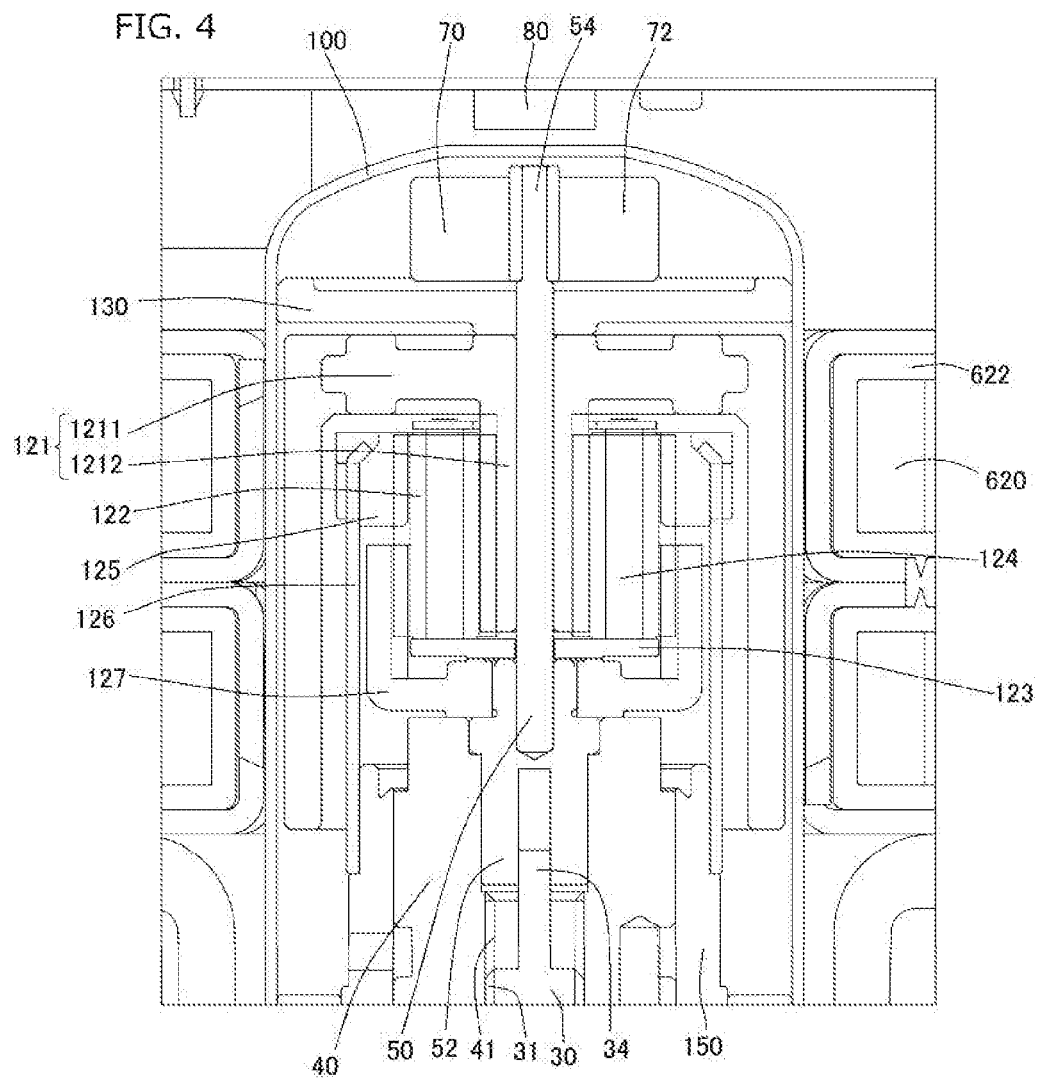
FIG. 4 is a further enlarged view of a portion of FIG. 3.

Referring to FIG. 2 to FIG. 4, a description will be provided of an electrically operated valve B according to the second embodiment. FIG. 2 is a schematic cross-sectional view of the electrically operated valve B according to the second embodiment. FIG. 3 is a schematic enlarged cross-sectional view of a portion of the electrically operated valve B according to the second embodiment. FIG. 4 is a further enlarged view of a portion of FIG. 3.

The electrically operated valve B includes a valve body 10, a valve seat 20, a driver 30, a rotation shaft 50, a power source 60 for transmitting power to the rotation shaft 50, a permanent magnet member 70 that includes a permanent magnet 72, and an angle sensor 80 for detecting a rotation angle of the permanent magnet 72.

The electrically operated valve B includes a first flow path 112 and a second flow path 114. When the valve body 10 and the valve seat 20 are separated from each other, that is, when the valve body 10 is in the upward position, the fluid flows into the valve chamber 113 via the first flow path 112, and the fluid in the valve chamber 113 is discharged via the second flow path 114. In contrast, when the valve body 10 and the valve seat 20 are in contact with each other, that is, when the valve body 10 is in the downward position, the first flow path 112 and the second flow path 114 are in a state of non-communication with each other.

It should be noted that in the example illustrated in FIG. 2, the first flow path 112, the valve seat 20, and the second flow path 114 are provided in a lower base member 2.

In the example illustrated in FIG. 2, the electrically operated valve B includes a power source 60 and a power transmission mechanism 120. The power source 60 includes a stator member 62 that includes a coil 620 and a rotor member 64. A pulse signal is input to the coil 620 from an electric wire 630 connected to the power source. Then, when a pulse signal is input to the coil 620, the rotor member 64 rotates by a rotation angle corresponding to the number of pulses of the pulse signal. That is, in the example illustrated in FIG. 2, the stator member 62 and the rotor member 64 constitute a stepping motor.

The power transmission mechanism 120 is a member for connecting the rotor member 64 and the rotation shaft 50 so as to enable power transmission. The power transmission mechanism 120 includes a plurality of gears. The power transmission mechanism 120 may include a planetary gear mechanism. Details of the planetary gear mechanism will be described later.

In the example illustrated in FIG. 2, the electrically operated valve B includes a housing member 4. An accommodation space SP (for example, a liquid-tight closed space) is formed in the housing member 4, and the above-described stator member 62, the can 100, the control substrate 90, and the like are accommodated in the accommodation space SP.

In the example illustrated in FIG. 2, the control substrate 90 is supported by the housing member 4. More specifically, the housing member 4 includes a cylindrical member 4a constituting a side wall and a cover member 4b, and the control substrate 90 is supported by the cover member 4b.

The control substrate 90 (more specifically, a circuit on the control substrate) controls the number of pulses supplied to the coil 620. When a predetermined number of pulses is supplied to the coil 620, the rotor member 64 rotates by a rotation angle corresponding to the number of pulses. The rotor member 64 and the rotation shaft 50 are connected via a power transmission mechanism 120 so as to enable power transmission.

Accordingly, when the rotor member 64 rotates, the rotation shaft 50 rotates by a rotation angle proportional to the rotation angle of the rotor member 64.

The rotation shaft 50 rotates the driver 30. In the example illustrated in FIG. 2, the second end 52 (that is, a shaft-side engagement member) of the rotation shaft 50 and the upper end 34 (that is, the driver-side engagement member) of the driver 30 are mechanically connected to each other so as not to be capable of rotation relative to each other. In addition, the second end 52 of the rotation shaft 50 and the upper end 34 of the driver 30 are movable relative to each other along the first axis Z. Accordingly, the rotation shaft 50 can move the driver 30 up and down without changing the vertical position of the rotation shaft 50 itself.

The permanent magnet member 70 is disposed at the first end 54 of the rotation shaft 50. In the example illustrated in FIG. 2, the position of the rotation shaft 50 in the vertical direction is not changed by the rotation operation of the rotation shaft 50. Accordingly, the position of the permanent magnet member 70 in the vertical direction, as well, is also not changed by the rotation operation of the rotation shaft 50. As a result, the distance between the permanent magnet member 70 and the angle sensor 80 is kept constant during the operation of the electrically operated valve B.

That is, in the second embodiment, since the rotation shaft 50 and the driver 30 are separate bodies, and the rotation shaft 50 and the driver 30 are movable relative to each other along the first axis Z, it is possible to maintain a constant distance between the permanent magnet member 70 disposed on the rotation shaft 50 and the angle sensor 80. As a result, the accuracy of the detection of the rotation angle of the permanent magnet 72 by the angle sensor 80 is improved. In cases where the rotation shaft 50 and the permanent magnet 72 move up and down along with the vertical movement of the driver 30, there is a risk that the detection accuracy of the rotation angle of the permanent magnet 72 by the angle sensor 80 may be lowered. In contrast, the second embodiment is innovative in that the rotation shaft 50 and the permanent magnet 72 are prevented from moving up and down even when the driver 30 moves vertically.

In the example illustrated in FIG. 2, it can also be said that the rotation shaft 50 itself functions as a permanent magnet positioning member that maintains a constant distance between the permanent magnet 72 and the angle sensor 80. In the second embodiment, the connection between the rotation shaft 50 and the permanent magnet member 70 may be any connection as long as the rotation shaft 50 and the permanent magnet member 70 are directly or indirectly connected so that they cannot move relative to each other. However, from the viewpoint of further ensuring the prevention of relative movement, it is preferable that the rotation shaft 50 and the permanent magnet member 70 be directly fixed to each other.

In the example illustrated in FIG. 2, a partition member 130 for partitioning the inside of the can into an upper space and a lower space is disposed inside the can 100. The permanent magnet member 70 is disposed in an upper space formed by the partition member 130; that is, a space between the partition member 130 and the end wall 102 of the can 100. Accordingly, even if chipping or the like occurs in the permanent magnet member 70, there is no risk that magnetic particles or the like may enter the lower space. It should be noted that the partition member 130 may be a bearing member that rotatably supports the rotation shaft 50 with respect to the can 100. In cases where the partition member 130 is a bearing member, the partition member 130 has both a function as a partition for separating the upper space in which the permanent magnet member 70 is disposed from the lower space in which the rotor member 64 and the like are disposed, as well as a function as a bearing. The partition member 130 has a disk shape, for example.

The material of the partition member 130 will be described. The partition member 130 of the present embodiment is made of, for example, a resin (e.g., polyphenylene sulfide (PPS)). Alternatively, the partition member 130 may be formed of a soft magnetic material. Examples of the soft magnetic material include iron, silicon steel, a resin having magnetism, and the like. The member for partitioning the inside of the can into the upper space and the lower space is made of a soft magnetic material, whereby interference between the magnetism of the permanent magnet member 70 and other magnetism, for example, the magnetism of the rotor member 64, can be prevented. In particular, the permanent magnet member 70 is magnetized at two poles in the circumferential direction, and the rotor member 64 is magnetized in such a manner that magnetic poles of four or more poles (for example, eight poles) alternate in the circumferential direction. Therefore, by preventing the interference between the magnetism of the permanent magnet member 70 and the magnetism of the rotor member 64, the deviation of the angle measured by the angle sensor 80 and the slight torque variation of the rotation of the rotor member 64 can be prevented. It is needless to say that the partition member 130 of the third embodiment described later may also be formed of a soft magnetic material.

(Power Transmission Mechanism)

An example of a mechanism for transmitting power from the power source 60 to the valve body 10 will be described in detail with reference to FIG. 3. FIG. 3 is a schematic enlarged cross-sectional view of a portion of the electrically operated valve B of the second embodiment.

In the example illustrated in FIG. 3, the stator member 62 that forms a portion of the power source 60 is fixed to the side wall 104 of the can 100. The stator member 62 includes a bobbin 622 and a coil 620 wound around the bobbin.

In the example illustrated in FIG. 3, the rotor member 64 that constitutes a portion of the power source 60 is disposed inside the side wall 104 of the can 100 so as to be freely rotatable with respect to the can 100. The rotor member 64 is formed of a magnetic material. The rotor member 64 is (fixedly) connected to a power transmission mechanism 120, such as the sun gear member 121, for example.

The sun gear member 121 includes a coupling portion 1211 coupled to the rotor member 64 and a sun gear 1212. The coupling portion 1211 extends along a radial direction (that is, a direction perpendicular to the first axis Z), and the sun gear 1212 extends along the first axis Z. In the axial hole of the sun gear 1212, the rotation shaft 50 is disposed so as to be freely rotatable relative to the inner wall of the sun gear.

The external teeth of the sun gear 1212 mesh with the plurality of planetary gears 122. Each planetary gear 122 is rotatably supported by a shaft 124 that is supported by a carrier 123. The outer teeth of each planetary gear 122 mesh with an annular ring gear 125 (internal tooth fixed gear).

The ring gear 125 is a member that cannot rotate relative to the can 100. In the example illustrated in FIG. 3, the ring gear 125 is supported by a holder 150 (to be described later) via a cylindrical support member 126.

In addition, the planetary gear 122 also meshes with an annular second ring gear 127 (an internal tooth movable gear). In the example illustrated in FIG. 3, the second ring gear 127 functions as an output gear fixed to the rotation shaft 50. Alternatively, an output gear different from the second ring gear 127 may be fixed to the rotation shaft 50, and power from the second ring gear 127 may be transmitted to the rotation shaft 50 via the output gear. It should be noted that fixing of the rotation shaft 50 to the output gear may be performed by press-fitting the rotation shaft 50 to the output gear.

The above-described gear configuration (the sun gear, planetary gear, internal tooth fixed gear, and internal tooth movable gear) constitutes a so-called eccentric planetary gear mechanism. In a reduction gear using an eccentric planetary gear mechanism, by setting the number of teeth of the second ring gear 127 to be slightly different from the number of teeth of the ring gear 125, the rotational speed of the sun gear 1212 can be reduced at a large reduction gear ratio and transmitted to the second ring gear 127.

It should be noted that in the example illustrated in FIG. 3, an eccentric planetary gear mechanism is employed as the power transmission mechanism 120. However, in embodiments, any power transmission mechanism can be employed as the power transmission mechanism between the rotor member 64 and the rotation shaft 50. As the power transmission mechanism 120, a planetary gear mechanism other than the eccentric planetary gear mechanism may be utilized.

As illustrated in FIG. 3, the rotation shaft 50 includes a first end 54 and a second end 52. In the example illustrated in FIG. 3, the rotation shaft 50 includes a rotation shaft body having a first end 54 and a shaft-side engagement member having a second end 52. The rotation shaft main body and the shaft-side engagement member are fixed to each other by, for example, welding or the like. The shaft-side engagement member engages with the driver-side engagement member formed by the upper end portion 34 of the driver 30 so as not to be rotatable relative to the driver-side engagement member while also being movable relative to the driver-side engagement member along the first axis Z direction.

An external thread 31 is provided on the outer peripheral surface of the driver 30. The external thread 31 is screwed to an internal thread 41 provided on a guide member 40 for guiding the driver. Accordingly, when the rotation shaft 50 and the driver 30 rotate about the first axis Z, the driver 30 moves up and down while being guided by the guide member 40. In contrast, the rotation shaft 50 is rotatably supported by a shaft receiving member such as the sun gear 1212 or the guide member 40, and cannot move in the first axis Z direction.

It should be noted that in the example illustrated in FIG. 3, the guide member 40 for guiding the driver 30 is supported by a holder 150 to be described later.

The lower end 32 of the driver 30 is rotatably connected to the upper end 12 of the valve body 10 via a ball 160 or the like. In the example illustrated in FIG. 3, when the driver 30 moves downward while rotating about the first axis Z, the valve body 10 moves downward without rotating about the first axis Z. In addition, when the driver 30 moves upward while rotating about the first axis Z, the valve body 10 moves upward without rotating about the first axis Z.

The downward movement of the valve body 10 is performed as a result of the valve body 10 being pushed by the driver 30. The upward movement of the valve body 10 is performed by pushing the valve body 10 upward by a spring member 170 such as a coil spring while the driver 30 is moving upward. That is, in the example illustrated in FIG. 3, the valve body 10 is constantly urged upward by the spring member 170 disposed between the spring bearing member 172 and the valve body 10. Alternatively or additionally, the valve body 10 and the driver 30 may be connected by a rotary joint, such as a ball joint, so that they cannot move relative to each other in a direction along the first axis Z. In this case, the spring member 170 may be omitted.

With the above configuration, it is possible to drive the valve body 10 by using the power from the power source 60. The amount of movement of the valve body 10 in the direction along the first axis Z is proportional to the amount of rotation of the rotation shaft 50 and the permanent magnet 72. Accordingly, in the second embodiment, by measuring the rotation angle of the permanent magnet 72 about the first axis Z by the angle sensor 80, it is possible to accurately determine the position of the valve body 10 in the direction along the first axis Z. It should be noted that the electrically operated valve B may include a computing device that converts the angle data output from the angle sensor 80 into position data of the valve body 10 in the direction along the first axis Z; that is, the opening degree data for the valve.

In the second embodiment, the rotation shaft 50 and the permanent magnet 72 do not move up and down with respect to the angle sensor 80. In other words, the distance between the permanent magnet 72 and the angle sensor 80 is maintained at a constant distance during the operation of the electrically operated valve B. Accordingly, in the second embodiment, it is possible to accurately calculate the rotation angle of the permanent magnet 72 and the position of the valve body 10 along the first axis Z using the angle sensor 80.

It should be noted that, in the example illustrated in FIG. 3, the holder 150 is disposed in the concave portion of the lower base member 2. In addition, a first seal member 152 such as an O-ring is disposed between the holder 150 and the lower base member 2. Further, the holder 150 defines an internal space in which the upper end portion 12 of the valve body 10 can move. Accordingly, the holder 150 has a function of accommodating the upper end portion 12 of the valve body 10 in addition to a sealing function of preventing the liquid from entering the space in which the stator member 62 and the like are disposed.

In addition, as described above, the holder 150 may have a function of supporting at least one of the cylindrical support member 126 or the guide member 40.

Further, in the example illustrated in FIG. 3, the holder 150 is disposed so as to be in contact with the side wall portion of the housing member 4. A second seal member 154 such as an O-ring is disposed between the holder 150 and the side wall of the housing member 4. Accordingly, the holder 150 can further prevent liquid from entering the space in which the stator member 62 and the like are disposed.

It should be noted that each configuration of the electrically operated valve B in the second embodiment may be adopted in the electrically operated valve A of the first embodiment illustrated in FIG. 1, as well.

Third Embodiment

Figure 5:
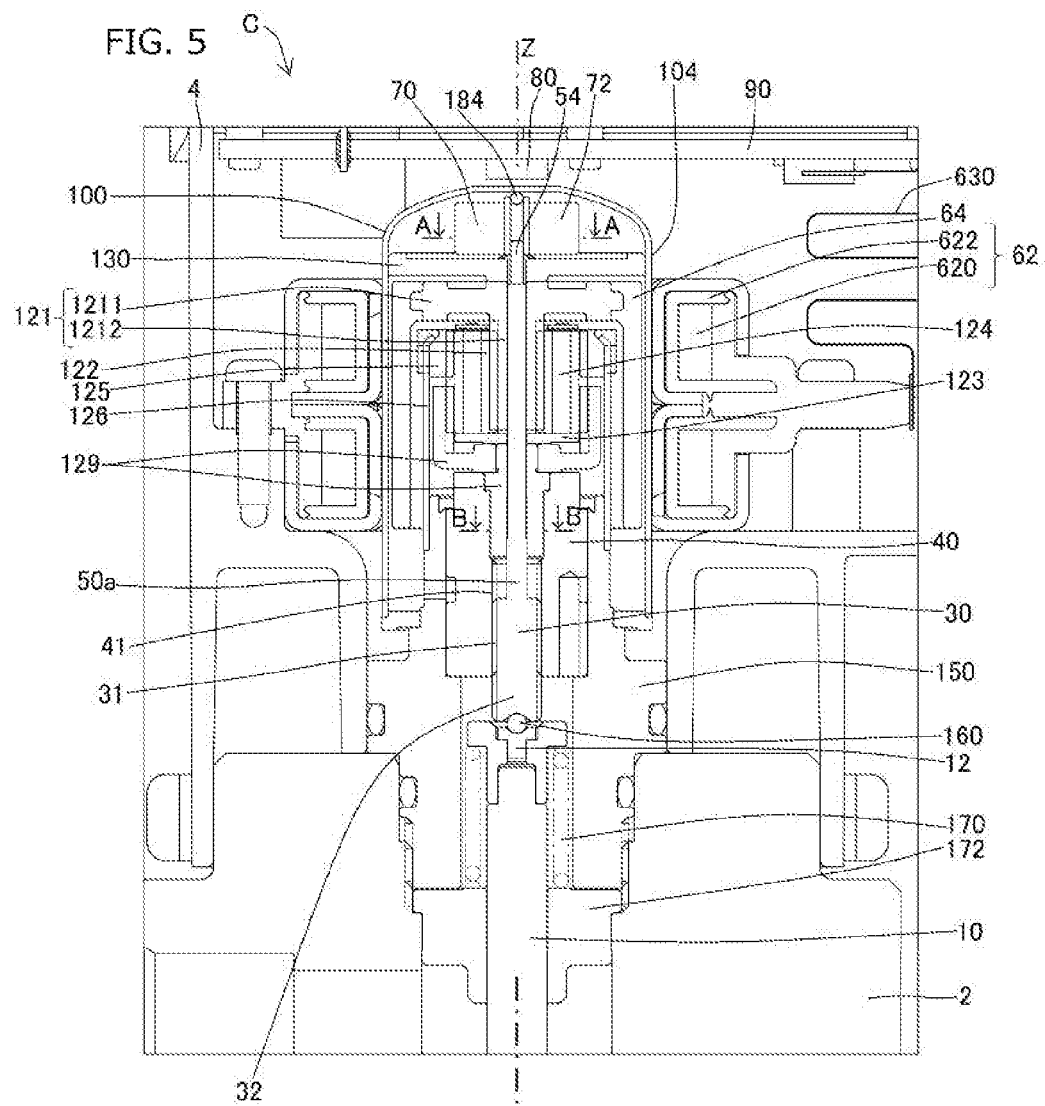
FIG. 5 is a schematic enlarged cross-sectional view of a portion of an electrically operated valve according to the third embodiment.
Figure 6:
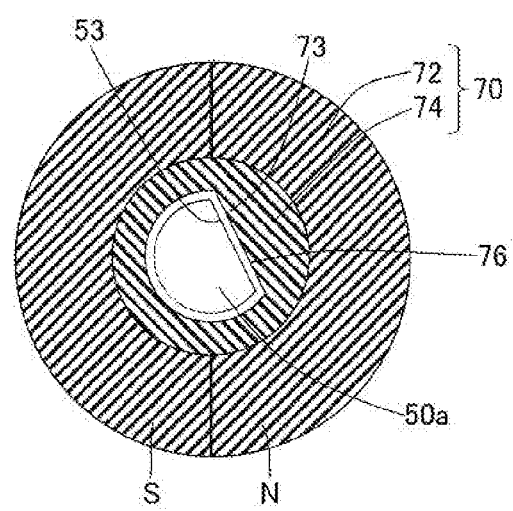
FIG. 6 is a cross-sectional view taken along the line A-A of FIG. 5.
Figure 7:
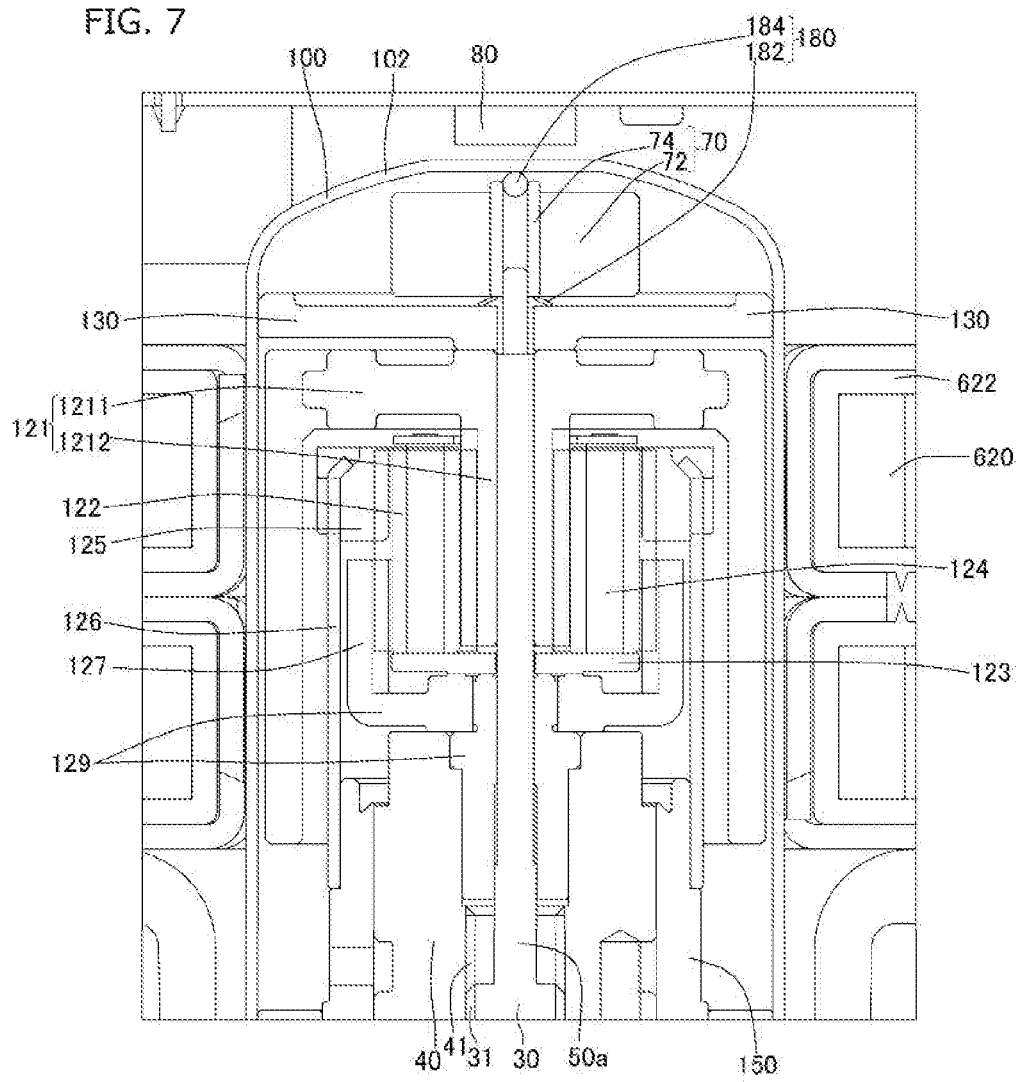
FIG. 7 is a further enlarged view of a portion of FIG. 5.
Figure 8:
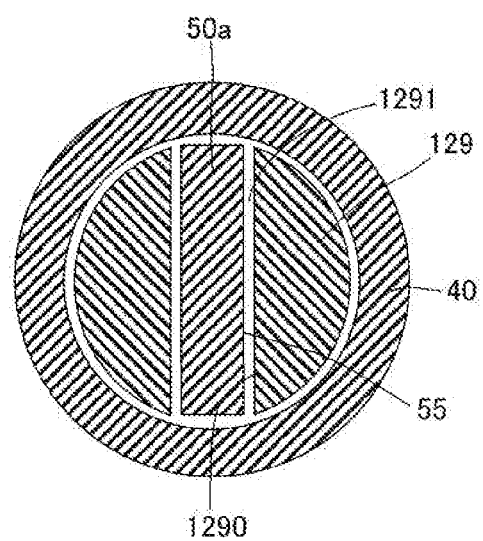
FIG. 8 is a cross-sectional view taken along the line B-B of FIG. 5.

Referring to FIG. 5 to FIG. 8, a description will be provided of an electrically operated valve C according to the third embodiment. FIG. 5 is a schematic enlarged cross-sectional view of a portion of the electrically operated valve B of the third embodiment. FIG. 6 is a cross-sectional view taken along the line A-A in FIG. 5. FIG. 7 is a further enlarged view of a portion of FIG. 5. FIG. 8 is a cross-sectional view taken along the line B-B in FIG. 5.

In the electrically operated valve C of the third embodiment, the configuration of the rotation shaft 50a and the support mechanism of the permanent magnet member 70 are different from the configuration of the rotation shaft and the support mechanism of the permanent magnet member in the first and second embodiments. Accordingly, in the third embodiment, the configuration of the rotation shaft 50a and the support mechanism of the permanent magnet member 70 will be primarily described, and the description of other repeated configurations will be omitted.

In the second embodiment, the rotation shaft 50 is a member that does not move up and down with respect to the can 100, whereas in the third embodiment, the rotation shaft 50a is a member that moves up and down with respect to the can 100 and the permanent magnet member 70. It should be noted that in the third embodiment, as in the second embodiment, the permanent magnet member 70 is a member that does not move up and down with respect to the can 100.

Referring to FIG. 6, an example of a mechanism for allowing relative movement of the rotation shaft 50a with respect to the permanent magnet member 70 will be described. As illustrated in FIG. 6, the permanent magnet member 70 has a second engagement portion 73 that engages with the first engagement portion 53 of the rotation shaft 50a. The first engagement portion 53 and the second engagement portion 73 engage with each other (contact each other) when the rotation shaft 50a rotates about the first axis Z. In contrast, the first engagement portion 53 and the second engagement portion 73 do not engage with each other in the direction along the first axis Z. Accordingly, the rotation shaft 50a cannot rotate relative to the permanent magnet member 70, and can move up and down relative to the permanent magnet member 70.

As illustrated in FIG. 6, the permanent magnet member 70 may include a hole 76, which may be a through hole or a non-through hole. The cross-sectional shape of the hole portion 76 perpendicular to the first axis Z is a non-circular shape (for example, a letter D-shape). The cross-sectional shape of the portion of the rotation shaft 50a that enters the hole portion 76 is complementary to the wall surface defining the inner surface of the hole portion 76, and has a non-circular shape (for example, a letter D-shape).

In the example illustrated in FIG. 6, the permanent magnet member 70 includes a permanent magnet 72 and a collar member 74 fixed to the permanent magnet 72. The collar member 74 is disposed inside the permanent magnet 72 (on the radial direction side). The collar member 74 is provided with the above-described second engagement portion 73.

In the example illustrated in FIG. 6, it is not the permanent magnet 72, but the collar member 74 that comes into contact with the rotation shaft 50a. Accordingly, the permanent magnet 72 is not worn by the contact between the rotation shaft 50a and the permanent magnet 72. The material of the collar member 74 is, for example, SUS304.

Next, a permanent magnet positioning member 180 that maintains a constant distance between the permanent magnet 72 and the angle sensor 80 will be described with reference to FIG. 7. The permanent magnet positioning member 180 is disposed inside the can 100, which serves as a case. In the example illustrated in FIG. 7, the permanent magnet positioning member 180 includes a ball 184 that functions as a bearing member and a leaf spring 182. In other words, the permanent magnet positioning member 180 is constituted by a ball 184 and a leaf spring 182 arranged so as to sandwich the permanent magnet member 70.

The ball 184 is disposed between the end wall 102 of the can 100 and the permanent magnet member 70. The ball 184 functions as a bearing for the permanent magnet member 70, and also functions as a positioning member that defines the vertical position of the permanent magnet member 70.

In the example illustrated in FIG. 7, the leaf spring 182 is disposed between the partition member 130 (the bearing member) and the permanent magnet member 70. The leaf spring 182 biases the permanent magnet member 70 toward the end wall 102 of the can 100. It should be noted that, in order to account for the assembly error of the electrically operated valve C, there are cases in which the partition member 130 (bearing member) may be disposed so as to be movable up and down by a small distance with respect to the can 100. Since the leaf spring 182 urges the permanent magnet member 70 against the end wall 102 even when the partition member can move up and down with respect to the can 100, the vertical position of the permanent magnet member 70 is preferably maintained.

It should be noted that a suitable bearing member different from the ball 184 may be disposed between the end wall 102 of the can 100 and the permanent magnet member 70. In addition, instead of the leaf spring 182, an optional bearing member may be disposed between the partition member 130 and the permanent magnet member 70. Even in this case, the distance between the permanent magnet 72 and the angle sensor 80 is kept constant by the suitable bearing member.

In the examples illustrated in FIG. 5 to FIG. 7, the rotation shaft 50a itself can move up and down. Accordingly, the rotation shaft 50a itself can be used as the driver 30. That is, the rotation shaft 50a has both a function of rotating the permanent magnet member 70 and a function as a driver for moving the valve body 10 toward the valve seat 20.

In the first and second embodiments, an example in which the rotation shaft 50 is fixed to the output gear has been described. In contrast, in the third embodiment, the output gear 129 and the rotation shaft 50a are not fixed to each other. Instead, the output gear 129 and the rotation shaft 50a are engaged with each other about the first axis Z so as not to be capable of rotation relative to each other.

Referring to FIG. 8, an example of an engagement mechanism for engaging the output gear 129 and the rotation shaft 50a so as not to be capable of rotation relative to each other will be described. FIG. 8 is a cross-sectional view taken along the line B-B in FIG. 5.

As illustrated in FIG. 8, the output gear 129 has a fourth engagement portion 1290 that engages with the third engagement portion 55 of the rotation shaft 50a. The third engagement portion 55 and the fourth engagement portion 1290 engage with each other (contact each other) when the rotation shaft 50a rotates about the first axis Z. In contrast, the third engagement portion 55 and the fourth engagement portion 1290 do not engage with each other in the direction along the first axis Z. Accordingly, the rotation shaft 50a cannot rotate relative to the output gear 129, and can move up and down relative to the output gear 129.

As illustrated in FIG. 8, the output gear 129 includes a rotation shaft receiving portion 1291, such as a hole or slit. The cross-sectional shape of the rotation shaft receiving portion 1291 is a non-circular shape (for example, a rectangular shape). The cross-sectional shape of the portion of the rotation shaft 50a that enters the rotation shaft receiving portion 1291 is complementary to the wall surface that defines the inner surface of the rotation shaft receiving portion 1291, and is a non-circular shape (for example, a rectangular shape).

As illustrated in FIG. 7, the output gear 129 is rotatably supported about the first axis Z by a support member such as the guide member 40.

In the third embodiment, the output gear 129 is rotated by the power from the power source 60. As the power transmission mechanism from the power source 60 to the output gear 129, a power transmission mechanism such as the planetary gear mechanism described in the second embodiment may be utilized.

When the output gear 129 rotates, the rotation shaft 50a rotates. In the third embodiment, the rotation shaft 50a and the driver 30 are integrally formed as one member, or are integrally fixed to each other. In addition, an external thread 31 is provided on the outer peripheral surface of the driver 30, and the external thread 31 is screwed to an internal thread 41 provided on the guide member 40 for guiding the driver.

Accordingly, when the rotation shaft 50a rotates, the rotation shaft 50a (the rotation shaft 50a including the driver) moves along the first axis Z. The rotation shaft 50a and the valve body 10 are mechanically connected to each other. Accordingly, when the rotation shaft 50a moves along the first axis Z, the valve body 10 also moves along the first axis Z.

With the above configuration, it is possible to drive the valve body 10 by using the power from the power source 60. The amount of movement of the valve body 10 in the direction along the first axis Z is proportional to the amount of rotation of the rotation shaft 50a and the permanent magnet 72. Accordingly, in the third embodiment, by measuring the rotation angle of the permanent magnet 72 about the first axis Z by the angle sensor 80, it is possible to accurately determine the position of the valve body 10 in the direction along the first axis Z. It should be noted that the electrically operated valve C may include a computing device that converts the angle data output from the angle sensor 80 into position data of the valve body 10 in the direction along the first axis Z; that is, opening degree data for the valve.

In the third embodiment, it is not necessary to fix the permanent magnet member 70 to the rotation shaft 50a. In addition, it is not necessary to fix the rotation shaft 50a to the output gear. Accordingly, it is possible to efficiently assemble the electrically operated valve C.

(Example of Angle Sensor)

An example of the angle sensor 80 of each embodiment will be described with reference to FIG. 9 to FIG. 12. FIG. 9 to FIG. 12 are diagrams schematically illustrating the placement relationship between the permanent magnet 72 and the angle sensor 80, in which a bottom view is illustrated on the top side and a partially cut-away perspective view is illustrated on the lower side.

As illustrated in FIG. 9, the permanent magnet 72 has a north pole and a south pole in a top view. In the example illustrated in FIG. 9, in the top view, the number of north poles of the permanent magnet 72 is 1 and the number of south poles of the permanent magnet 72 is 1. Alternatively, the number of north poles of the permanent magnet and the number of south poles of the permanent magnet may be two or more, respectively, in the top view. In the example illustrated in FIG. 9, the permanent magnet 72 includes a north pole and a south pole interface 78, and this interface 78 is a plane perpendicular to the first axis Z, passing through the first axis Z coinciding with the central axis of the rotation shaft (50; 50a). A north pole is disposed on one side of the interface 78, and a south pole is disposed on the other side of the interface 78. It should be noted that the permanent magnet 72 is, for example, a magnet having a disk shape. In addition, the permanent magnet 72 may be a plastic magnet obtained by molding a mixture of magnetic powder and a resin binder.

The angle sensor 80 is disposed above the permanent magnet 72. In the example illustrated in FIG. 9, the angle sensor 80 is located on an extension of the rotation shaft (50; 50a); that is, on the first axis Z. The angle sensor 80 includes at least one magnetic detection element 82 (for example, a Hall element, a magnetoresistive element, or the like), and more preferably includes two or more or three or more magnetic detection elements.

In the example illustrated in FIG. 9, the angle sensor 80 includes four magnetic detection elements (82a to 82d). The magnetic detection elements (82a to 82d) may be elements for detecting a component of the magnetic flux in the direction along the first axis Z. In FIG. 9, the magnetic detection element 82a and the magnetic detection element 82d detect the magnetic flux component in the +Z direction, and the magnetic detection element 82b and the magnetic detection element 82c detect the magnetic flux component in the −Z direction. When the magnitude of the magnetic flux detected by the magnetic detection element 82a (or magnetic detection element 82b) and the magnitude of the magnetic flux detected by the magnetic detection element 82*d* (or magnetic detection element 82*c*) are equal, the interface 78 is perpendicular to the X-axis. At this time, the angle sensor 80 determines that the rotation angle of the permanent magnet 72 is, for example, 0 degrees.

As illustrated in FIG. 10, it is assumed that the permanent magnet 72 rotates in the R direction. In FIG. 10, the magnetic detection element 82*a* and the magnetic detection element 82*d* detect the magnetic flux component in the +Z direction, and the magnetic detection element 82*b* and the magnetic detection element 82*c* detect the magnetic flux component in the −Z direction. As the state illustrated in FIG. 9 shifts to the state illustrated in FIG. 10, the magnitude of the magnetic flux detected by the magnetic detection element 82*b* and the magnetic detection element 82*d* increases, and the magnitude of the magnetic flux detected by the magnetic detection element 82*a* and the magnetic detection element 82*c* decreases. For example, based on the ratio of the magnitude of the magnetic flux detected by the magnetic detection element 82*a* to the magnitude of the magnetic flux detected by the magnetic detection element 82*d*, and the ratio of the magnitude of the magnetic flux detected by the magnetic detection element 82*a* to the magnitude of the magnetic flux detected by the magnetic detection element 82*b*, the angle sensor 80 can determine the inclination of the magnetic force line with respect to the X-axis; that is, the rotation angle of the permanent magnet 72.

Figure 11:
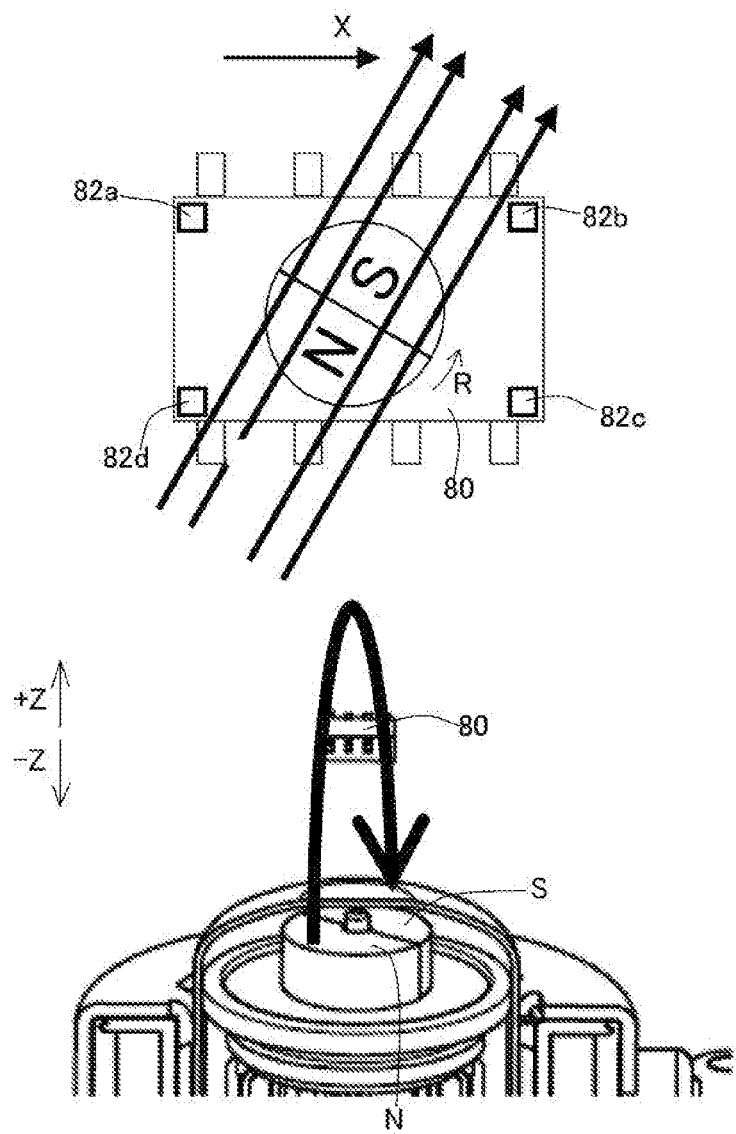
FIG. 11 is a diagram schematically illustrating the placement relationship between the permanent magnet and the angle sensor.

As illustrated in FIG. 11, it is assumed that the permanent magnet 72 further rotates in the R direction. In FIG. 11, the magnetic detection element 82*d* detects the magnetic flux component in the +Z direction, and the magnetic detection element 82*b* detects the magnetic flux component in the −Z direction. As the state illustrated in FIG. 10 shifts to the state illustrated in FIG. 11, the magnitude of the magnetic flux detected by the magnetic detection element 82*b* and the magnetic detection element 82*d* decreases. Further, the magnitude of the magnetic flux detected by the magnetic detection elements 82*a* and 82*c* decreases. For example, based on the ratio of the magnitude of the magnetic flux detected by the magnetic detection element 82*a* to the magnitude of the magnetic flux detected by the magnetic detection element 82*d*, and the ratio of the magnitude of the magnetic flux detected by the magnetic detection element 82*a* to the magnitude of the magnetic flux detected by the magnetic detection element 82*b*, the angle sensor 80 can determine the inclination of the magnetic force line with respect to the X-axis; that is, the rotation angle of the permanent magnet 72.

Figure 12:
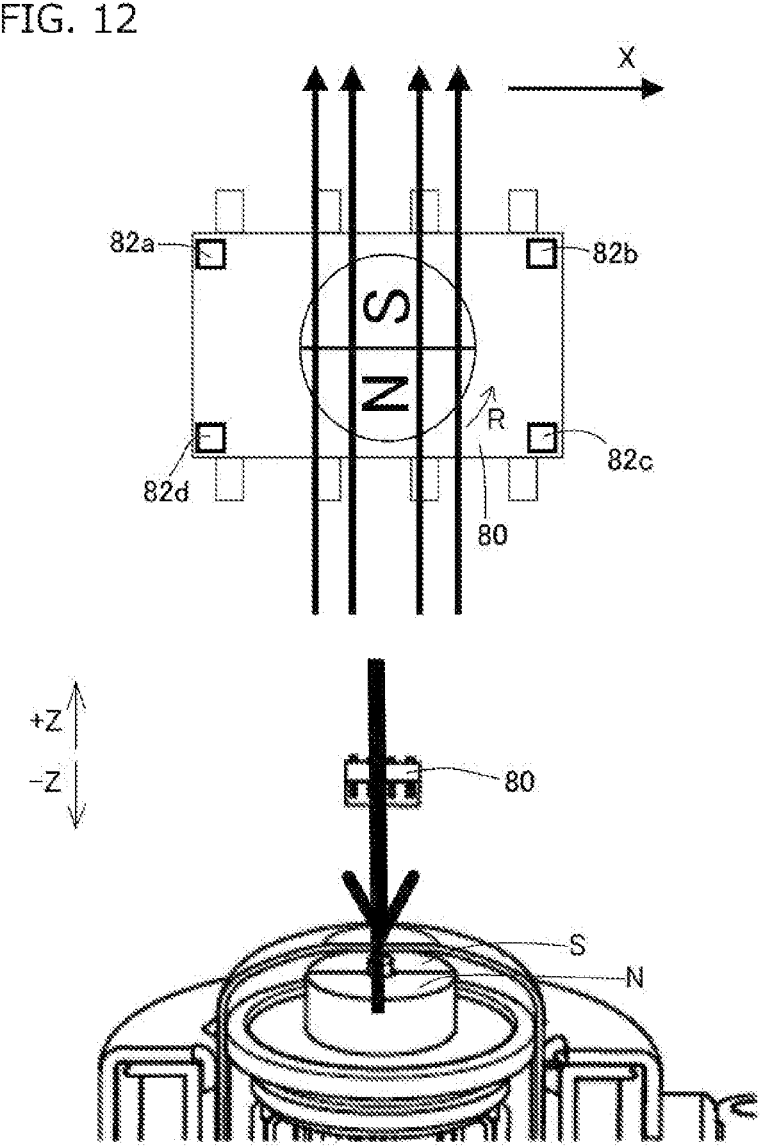
FIG. 12 is a diagram schematically illustrating the placement relationship between the permanent magnet and the angle sensor.

As illustrated in FIG. 12, it is assumed that the permanent magnet 72 further rotates in the R direction. In FIG. 12, the magnetic detection element 82*c* and the magnetic detection element 82*d* detect the magnetic flux component in the +Z direction, and the magnetic detection element 82*a* and the magnetic detection element 82*b* detect the magnetic flux component in the −Z direction. As the state shifts from the state illustrated in FIG. 11 to the state illustrated in FIG. 12, the magnitude of the magnetic flux detected by the magnetic detection element 82*a* and the magnetic detection element 82*c* increases, and the magnitude of the magnetic flux detected by the magnetic detection element 82*b* and the magnetic detection element 82*d* decreases. For example, based on the ratio of the magnitude of the magnetic flux detected by the magnetic detection element 82*a* to the magnitude of the magnetic flux detected by the magnetic detection element 82*d*, and the ratio of the magnitude of the magnetic flux detected by the magnetic detection element 82*a* to the magnitude of the magnetic flux detected by the magnetic detection element 82*b*, the angle sensor 80 can determine the inclination of the magnetic force line with respect to the X-axis; that is, the rotation angle of the permanent magnet 72.

As can be seen from FIG. 9 to FIG. 12, the angle sensor 80 can detect the inclination of the permanent magnet 72 with respect to the X-axis; that is, the absolute rotation angle of the permanent magnet 72. Put differently, even when the permanent magnet 72 does not rotate, the angle sensor 80 can calculate the inclination (that is, the rotation angle) of the permanent magnet 72 with respect to the X-axis. The calculation of the rotation angle is performed based on, for example, the direction of the magnetic flux passing through at least three of the magnetic detection elements 82 and the magnitude of the magnetic flux passing through at least three of the magnetic detection elements 82.

In the examples illustrated in FIG. 9 to FIG. 12, the angle sensor 80 can detect the absolute rotation angle of the permanent magnet 72. Accordingly, even when the power of the electrically operated valve is turned off and the rotation angle information of the permanent magnet 72 is lost, when the power is turned on again, the angle sensor 80 can immediately obtain (output) the rotation angle of the permanent magnet 72.

In the examples illustrated in FIG. 9 to FIG. 12, an example has been described in which each magnetic detection element detects the magnetic flux component in a direction along the first axis (Z axis). Alternatively, each magnetic detection element may detect the magnetic flux component in a direction along the X-axis and/or the magnetic flux component in a direction along the Y-axis perpendicular to both the X-axis and the Z-axis.

It should be noted that each of the permanent magnet 72 and the angle sensor 80 described with reference to FIG. 9 to FIG. 12 can be utilized in the electrically operated valve of the first and second embodiments or the electrically operated valve in the third embodiment.

(Computing Device for Determining the Presence or Absence of an Abnormality in the Operation of the Electrically Operated Valve)

Figure 13:
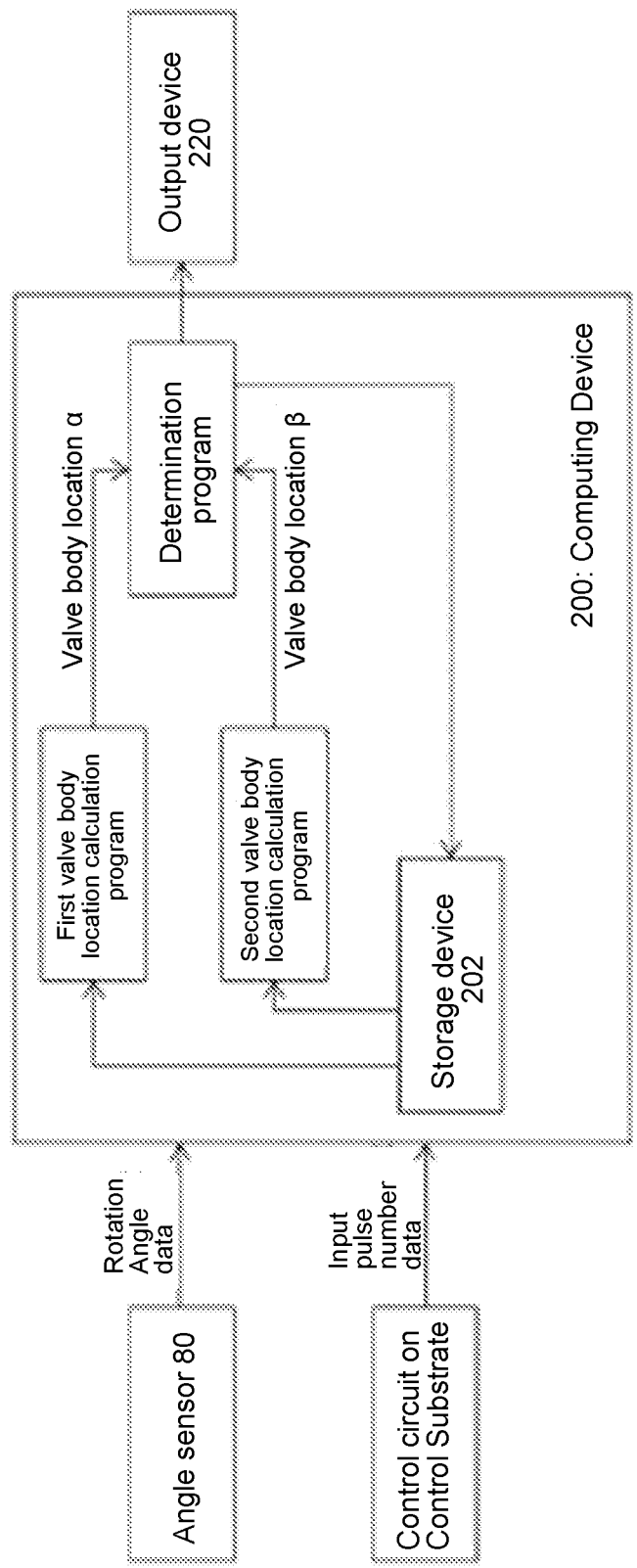
FIG. 13 is a functional block diagram schematically illustrating the function of the computing device for determining the presence or absence of an abnormality in the operation of the electrically operated valve.

Referring to FIG. 13, a computing device 200 for determining whether or not there is an abnormality in the operation of the electrically operated valve will be described. FIG. 13 is a functional block diagram schematically illustrating the function of the computing device 200 for determining the presence or absence of an abnormality in the operation of the electrically operated valve.

The electrically operated valve includes a computing device 200. The computing device 200 includes, for example, a hardware processor and a storage device 202, and is connected to an output device 220 so as to be capable of information transmission. The electrically operated valve may also be an electrically operated valve system that includes the computing device 200 (or, alternatively, the computing device and the output device 220).

The electrically operated valves B and C (electrically operated valve systems) include a stator member 62 having a coil 620 and a rotor member 64 as described in the second or third embodiment. The rotation angle of the rotor member 64 and the position of the valve body 10 proportional to the rotation angle of the rotor member 64 (that is, the height from the valve seat 20) are proportional to the number of input pulses input to the coil 620. Accordingly, by monitoring the number of input pulses input to the coil 620, it is possible to calculate the position of the valve body 10 (that is, the height from the valve seat 20).

On the other hand, the position of the valve body 10 (that is, the height from the valve seat 20) is also proportional to the rotation angle of the permanent magnet 72. Accordingly, by monitoring the rotation angle of the permanent magnet 72, it is possible to calculate the position of the valve body 10 (that is, the height from the valve seat 20). In principle, the position of the valve body 10 calculated from the number of pulses input to the coil 620 coincides with the position of the valve body 10 calculated from the rotation angle of the permanent magnet 72. Accordingly, when the position of the valve body 10 calculated from the number of input pulses to the coil 620 and the position of the valve body 10 calculated from the rotation angle of the permanent magnet 72 are different from each other, the computing device 200 determines that there is some abnormality in the electrically operated valves B and C. That is, the electrically operated valves B and C (electrically operated valve systems) have a self-diagnostic function for detecting the presence or absence of abnormalities in their own operation.

It should be noted that the position of the valve body 10 and the rotation angle of the rotation shaft 50 are proportional to each other, the position of the valve body 10 and the rotation angle of the permanent magnet 72 are proportional to each other, and the position of the valve body 10 and the rotation angle of the output gear are proportional to each other. Accordingly, in the present specification, calculating the position of the valve body 10 and calculating the rotation angle of the rotation shaft 50 are equivalent, calculating the position of the valve body 10 and calculating the rotation angle of the permanent magnet 72 are equivalent, and calculating the position of the valve body 10 and calculating the rotation angle of the output gear are equivalent.

Referring to FIG. 13, the computing device 200 will be described in more detail. The computing device 200 receives the rotation angle data of the permanent magnet from the angle sensor 80 via a wired or wireless communication. In addition, the computing device 200 receives data regarding the number of input pulses to the coil 620 from the above-described control substrate 90 or the like via a wired or wireless communication. The computing device 200 stores the received rotation angle data and input pulse number data in the storage device 202.

The storage device 202 of the computing device 200 stores a first valve body position calculation program for calculating the position $\alpha$ of the valve body 10 based on the rotation angle data of the permanent magnet. It should be noted that, in the present specification, the position $\alpha$ of the valve body 10 includes a physical quantity proportional to the position of the valve body 10, such as the rotation angle of the rotation shaft 50, the rotation angle of the permanent magnet, or the rotation angle of the output gear, in addition to the position of the valve body 10 itself. The computing device 200 calculates the position $\alpha$ of the valve body 10 from the rotation angle data of the permanent magnet by executing the first valve body position calculation program.

In addition, the storage device 202 of the computing device 200 stores a second valve body position calculation program for calculating the position ß of the valve body 10 based on the data of the input pulse number. It should be noted that, in the present specification, the position ß of the valve body 10 includes a physical quantity proportional to the position of the valve body 10 such as the rotation angle of the rotation shaft 50, the rotation angle of the permanent magnet, or the rotation angle of the output gear, in addition to the position of the valve body 10 itself. The computing device 200 calculates the position ß of the valve body 10 from the data of the number of pulses input to the coil 620 by executing the second valve body position calculation program.

Further, the storage device 202 of the computing device 200 stores a determination program for comparing the position $\alpha$ of the valve body and the position ß of the valve body to determine whether or not there is an operation abnormality of the electrically operated valve (the electrically operated valve system) based on this comparison result. The computing device 200 determines whether or not there is an abnormality in the operation of the electrically operated valve (the electrically operated valve system) by executing the determination program. For example, the computing device 200 executes the determination program to determine whether or not the difference between the position $\alpha$ of the valve body and the position ß of the valve body is equal to or larger than a preset threshold value. Then, by executing the determination program, when the difference between the position $\alpha$ of the valve body and the position ß of the valve body is equal to or larger than a preset threshold value, the computing device 200 may determine that there is an operation abnormality of the electrically operated valve (the electrically operated valve system). When it is determined that there is an abnormality in the operation of the electrically-operated valve (the electrically-operated valve system), the computing device 200 may execute the determination program to transmit a signal to an output device 220 such as a display or a warning device in order to provide notification of the abnormal operation. Alternatively or additionally, when it is determined that there is an abnormality in the operation of the electrically-operated valve (the electrically-operated valve system), the computing device 200 may store the determination result in the storage device 202 by executing the determination program. In this case, the abnormal operation of the electrically operated valve (the electrically-operated valve system) is stored in the storage device 202 as log data.

When the electrically operated valve (the electrically-operated valve system) includes the above-described computing device 200, it is possible to double-check the position of the valve body 10 using both the number of input pulses to the coil 620 and the rotation angle of the permanent magnet measured by the angle sensor. As a result, the reliability of the electrically operated valve (the electrically operated valve system) is dramatically improved.

It should be noted that instead of using the programs such as the first valve body position calculation program, the second valve body position calculation program, and the determination program in the above-described computing device 200, the first valve body position calculation, the second valve body position calculation, and the determination of the presence or absence of the abnormality in the operation of the electrically operated valve (the electrically operated valve system) may be performed by an electronic circuit in a hardware manner. The electronic circuit or the hardware processor of the computing device 200 may be mounted on the control substrate 90.

The configuration of the computing device 200 and the like described with reference to FIG. 13 may be employed in the electrically-operated valve B of the second embodiment or the electrically-operated valve C of the third embodiment. In cases where at least a stator member including a coil and a rotor member connected so as to enable power transmission to the rotation shaft are added to the electrically-operated valve A in the first embodiment illustrated in FIG. 1, the configuration of the computing device 200 and the like described with reference to FIG. 13 may be utilized in the electrically-operated valve A of the embodiment illustrated in FIG. 1.

The present invention is not limited to the above-described embodiments. Within the scope of the present invention, it is possible to freely combine the above-described embodiments, to modify any component of each embodiment, or to omit any component in each embodiment.

REFERENCE SIGNS LIST

A, B, C: Electrically operated valve
2: Lower base member
4: Housing member
4a: Cylindrical member
4b: Cover member
10: Valve body
12: Upper end
20: Valve seat
30: Driver
31: External thread
32: Lower end
34: Upper end
40: Guide member
41: Internal thread
50: Rotation shaft
50a: Rotation shaft
52: Second end
53: First engagement portion
54: First end
55: Third engagement portion
60: Power source
62: Stator member
64: Rotor member
70: Permanent magnet member
72: Permanent magnet
73: Second engagement portion
74: Collar member
76: Hole
78: Interface
80: Angle sensor
82: Magnetic detection element
82a-82d: Magnetic detection element
90: Control substrate
100: Can
102: End wall
104: Sidewall
112: First flow path
113: Valve chamber
114: Second flow path
120: Power transmission mechanism
121: Sun gear member
122: Planetary gear
123: Carrier
124: Shaft
125: Ring gear
126: Support member
127: Second ring gear
129: Output gear
130: Partition member
150: Holder
152: First seal member
154: Second seal member
160: Ball
170: Spring member
172: Spring bearing member
180: Permanent magnet positioning member
182: Leaf spring
184: Ball
200: Computing device
202: Storage device
220: Output device
620: Coil
622: Bobbin
630 Wire
1211: Connection
1212: Sun gear
1290: Fourth engagement portion
1291: Rotation shaft receiving portion

The invention claimed is:

1. An electrically operated valve comprising:
a valve body;
a driver configured to move the valve body in a direction parallel to a first axis;
a rotation shaft configured to rotate the driver around the first axis, wherein the driver and the rotation shaft are separate bodies and the driver and the rotation shaft are movable relative to each other along the first axis;
a permanent magnet member disposed on the rotation shaft and configured to rotate with the rotation shaft;
an angle sensor configured to detect a rotation angle of a permanent magnet included in the permanent magnet member; and
a case for housing the permanent magnet member,
wherein:
the angle sensor is disposed above the permanent magnet, and
an end wall of the case is disposed between the angle sensor and the permanent magnet member.

2. The electrically operated valve according to claim 1, wherein:
the angle sensor is supported by a control substrate configured to control a rotational movement of the rotation shaft.

3. The electrically operated valve according to claim 1, wherein:
a permanent magnet positioning member configured to maintain a constant distance between the permanent magnet and the angle sensor is disposed inside the case.

4. The electrically operated valve according to claim 1, further comprising a partition member configured to divide a space within the case into an upper space and a lower space; and
wherein the permanent magnet member is disposed in the upper space.

5. The electrically operated valve according to claim 4, wherein:
the partition member is formed of a soft magnetic material.

6. The electrically operated valve according to claim 1, wherein:
the rotation shaft is movable relative to the permanent magnet member in a direction along the first axis; and
the permanent magnet member includes a second engagement portion configured to engage with a first engagement portion of the rotation shaft such that the permanent magnet rotates with the rotation shaft.

7. The electrically operated valve according to claim 1, wherein:
the angle sensor includes a plurality of magnetic elements configured to detect a component of a magnetic flux in a direction along the first axis.

8. The electrically operated valve according to claim 1, further comprising:

a stator member that includes a coil;
a rotor member coupled to the rotation shaft so as to enable power transmission; and
a computing device configured to determine a presence or absence of an operation abnormality of the electrically operated valve, and
wherein:
the computing device is configured to determine the presence or absence of an operation abnormality of the electrically operated valve based on a rotation angle measured by the angle sensor and a number of input pulses to the coil.

9. An electrically operated valve comprising:
a valve body;
a driver configured to move the valve body along a first axis;
a rotation shaft configured to rotate the driver around the first axis;
a permanent magnet member disposed on the rotation shaft and configured to rotate with the rotation shaft;
an angle sensor configured to detect a rotation angle of a permanent magnet included in the permanent magnet member; and
a case for housing the permanent magnet member,
wherein:
the angle sensor is disposed above the permanent magnet,
an end wall of the case is disposed between the angle sensor and the permanent magnet member,
the angle sensor is supported by a control substrate configured to control a rotational movement of the rotation shaft,
a permanent magnet positioning member configured to maintain a constant distance between the permanent magnet and the angle sensor is disposed inside the case,
a partition member configured to divide a space within the case into an upper space and a lower space is further included,
the permanent magnet member is disposed in the upper space,
the partition member is formed of a soft magnetic material,
the driver and the rotation shaft are separate bodies,
the driver and the rotation shaft are movable relative to each other along the first axis, and
the angle sensor includes a plurality of magnetic elements configured to detect a component of a magnetic flux in a direction along the first axis;
the electrically operated valve further comprises:
a stator member that includes a coil,
a rotor member coupled to the rotation shaft so as to enable power transmission, and
a computing device configured to determine a presence or absence of an operation abnormality of the electrically operated valve;
wherein:
the computing device is configured to determine the presence or absence of an operation abnormality of the electrically operated valve based on a rotation angle measured by the angle sensor and a number of input pulses to the coil.

10. An electrically operated valve comprising:
a valve body;
a driver configured to move the valve body in a direction parallel to a first axis;
a rotation shaft configured to rotate the driver around the first axis, wherein the driver and the rotation shaft are separate bodies and the driver and the rotation shaft are movable relative to each other along the first axis;
a permanent magnet member disposed on the rotation shaft and configured to rotate with the rotation shaft;
an angle sensor configured to detect a rotation angle of a permanent magnet included in the permanent magnet member; and
a case for housing the permanent magnet member,
wherein:
the angle sensor is disposed above the permanent magnet,
an end wall of the case is disposed between the angle sensor and the permanent magnet member,
the angle sensor is supported by a control substrate configured to control a rotational movement of the rotation shaft,
a permanent magnet positioning member configured to maintain a constant distance between the permanent magnet and the angle sensor is disposed inside the case,
a partition member configured to divide a space within the case into an upper space and a lower space is further included,
the permanent magnet member is disposed in the upper space,
the partition member is formed of a soft magnetic material,
the rotation shaft is movable relative to the permanent magnet member in a direction along the first axis,
the permanent magnet member includes a second engagement portion configured to engage with a first engagement portion of the rotation shaft such that the permanent magnet rotates with the rotation shaft, and
the angle sensor includes a plurality of magnetic elements configured to detect a component of a magnetic flux in a direction along the first axis;
the electrically operated valve further comprises:
a stator member that includes a coil,
a rotor member coupled to the rotation shaft so as to enable power transmission, and
a computing device configured to determine a presence or absence of an operation abnormality of the electrically operated valve;
wherein:
the computing device is configured to determine the presence or absence of an operation abnormality of the electrically operated valve based on a rotation angle measured by the angle sensor and a number of input pulses to the coil.

* * * * *